US008449970B2

(12) United States Patent
Pellerite et al.

(10) Patent No.: US 8,449,970 B2
(45) Date of Patent: May 28, 2013

(54) ANTISTATIC ARTICLE, METHOD OF MAKING THE SAME, AND DISPLAY DEVICE HAVING THE SAME

(75) Inventors: Mark J. Pellerite, Woodbury, MN (US); Mahfuza B. Ali, Mendota Heights, MN (US); Eileen M. Haus, St. Paul, MN (US); Gregory F. King, Minneapolis, MN (US); James E. Lockridge, St. Paul, MN (US); Hang K. Loi, Woodbury, MN (US); Jeffrey A. Peterson, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1611 days.

(21) Appl. No.: 11/781,461

(22) Filed: Jul. 23, 2007

(65) Prior Publication Data
US 2009/0029129 A1    Jan. 29, 2009

(51) Int. Cl.
*B32B 7/02* (2006.01)
*B32B 27/00* (2006.01)
*B32B 27/06* (2006.01)
*B32B 27/34* (2006.01)
*B32B 27/36* (2006.01)
*B29C 55/02* (2006.01)
*C08L 33/04* (2006.01)
*C08G 63/48* (2006.01)

(52) U.S. Cl.
USPC ........ 428/212; 428/336; 428/412; 428/473.5; 428/474.4; 428/480; 264/291; 525/222; 525/55; 526/288; 526/312

(58) Field of Classification Search
USPC ............... 428/212, 336, 412, 473.5, 474.4, 428/480, 500; 264/291; 525/222, 55; 526/288, 526/312
See application file for complete search history.

(56) References Cited

U.S. PATENT DOCUMENTS

| | | | |
|---|---|---|---|
| 3,928,697 A | 12/1975 | Mallinson et al. | |
| 4,089,997 A | 5/1978 | Van Paesschen et al. | |
| 4,642,263 A | 2/1987 | Culbertson | |
| 5,124,381 A | 6/1992 | Ward | |
| 5,248,522 A | 9/1993 | Araki et al. | |
| 5,310,591 A | 5/1994 | Dodge et al. | |
| 5,534,322 A | 7/1996 | Ueyama et al. | |
| 5,709,926 A | 1/1998 | Gust | |
| 5,919,552 A | 7/1999 | Malhotra | |
| 5,925,447 A * | 7/1999 | Gust et al. .................. | 428/219 |
| 6,042,752 A | 3/2000 | Mitsui | |
| 6,114,440 A | 9/2000 | Yamaya et al. | |
| 6,577,358 B1 | 6/2003 | Arakawa et al. | |
| 7,038,746 B2 | 5/2006 | Tominagan et al. | |
| 7,041,365 B2 | 5/2006 | Kausch et al. | |
| 2002/0032271 A1 * | 3/2002 | Katashima et al. ........... | 524/495 |
| 2003/0157317 A1 | 8/2003 | Ito et al. | |
| 2005/0003163 A1 * | 1/2005 | Krishnan ..................... | 428/190 |
| 2005/0083450 A1 | 4/2005 | Motomura et al. | |
| 2005/0186408 A1 * | 8/2005 | Condo et al. ................. | 428/212 |
| 2005/0225857 A1 | 10/2005 | Inagaki | |
| 2005/0255325 A1 * | 11/2005 | Inagaki ........................ | 428/447 |
| 2005/0271826 A1 * | 12/2005 | Kuroda ........................ | 427/446 |
| 2006/0035070 A1 | 2/2006 | Kitazawa et al. | |

FOREIGN PATENT DOCUMENTS

| | | |
|---|---|---|
| EP | 362568 | 4/1990 |
| EP | 0 512 540 | 11/1992 |
| GB | 1484868 | 9/1977 |
| JP | 5094053 | 7/1975 |
| JP | 60248745 | 12/1985 |
| JP | 1994-172563 | 6/1994 |
| JP | 1994-316024 | 11/1994 |
| JP | 06316024 A * | 11/1994 |
| JP | 08-143691 | 6/1996 |
| JP | 08-157626 | 6/1996 |
| JP | 08-286004 | 11/1996 |
| JP | 08-325399 | 12/1996 |
| JP | 10-029285 | 2/1998 |
| JP | 11-202104 | 7/1999 |
| JP | 2000-026817 | 1/2000 |
| JP | 2003-154616 | 5/2003 |
| JP | 2004-175821 | 6/2004 |
| JP | 2006-076212 | 3/2006 |
| JP | 2006-142544 | 8/2006 |
| JP | 2007-119600 | 5/2007 |
| JP | 2007119600 A * | 5/2007 |
| JP | 2007178492 | 7/2012 |
| KR | 2007-0003246 | 1/2007 |
| KR | 20070003246 | 1/2007 |

OTHER PUBLICATIONS

Machine_English_Translation_JP_06316024_A; Antistatic Transfer Foil; Nov. 15, 1994; JPO; whole document.*
Machine_English_Translation_JP_2007119600_A; Tanabe, Daisuke; Printing Varnish Composition Having Antistatic Effect, Substrate Coated Therewith, and Processed Molding of the Substrate; May 17, 2007; JPO; whole document.*
Supplementary European Search Report, EP Application No. 08781532, dated Jan. 26, 2012.

* cited by examiner

*Primary Examiner* — David Sample
*Assistant Examiner* — Tahseen N Khan

(57) ABSTRACT

An antistatic article having an antistatic layer disposed on a substrate is disclosed herein. The antistatic layer is formed from a cationic copolymer, a non-cationic (meth)acrylic polymer, and a crosslinking agent. The cationic copolymer consists essentially of a cationic monomer, a hydrophobic monomer, a crosslinkable monomer, and an optional nitrogen-containing monomer. The substrate may comprise an optical film such as a multilayer optical film. Methods for making the antistatic article and display devices containing the antistatic article are also disclosed.

14 Claims, No Drawings

ANTISTATIC ARTICLE, METHOD OF MAKING THE SAME, AND DISPLAY DEVICE HAVING THE SAME

FIELD

The invention relates to an antistatic article having an antistatic layer comprising a cationic polymer.

BACKGROUND

Articles such as optical articles used in display devices must meet stringent performance criteria including high light transmissivity, clarity, and ultra-clean appearance. Detrimental to optical performance are defects such as particles, non-planar topography, and disproportionate degree of contact (sometimes referred to as "wet-out"). These defects can be, in part, a result of static charges that are introduced by manufacturing, converting, or assembly processes.

For example, static charges can result from a tape (e.g. masking) or other film that is quickly pulled or peeled away from the target substrate/film during processing. These static charges can subsequently attract particles of dust or other debris that may be near the surface of a film. Particles that eventually land or become anchored on the film can lead to unwanted light blockages, refracting, or absorbance, depending on the film's original purpose. A non-planar topography can be the result of non-uniform shrinkage, warping, or expansion of a film, particularly when an area of the film is pinched or mechanically held in place while movement or creep occurs with another portion of the film. Another cause, however, may be static charges that can create the pinched or stationary area, causing binding between film layers and consequently lead to non-uniform or non-synchronized film changes. The optical defect known as the "wet-out" phenomenon can occur when differences in optical transmission exist between two regions, or when interference patterns such as "Newton's rings" are observed. (The defect is minimally detectable when the wet-out is uniform throughout a film product.) Static charges can contribute to non-uniform attraction of particular areas between two layered films, causing wet-out.

Accordingly, there is a need for antistatic compositions that can be used to form antistatic layers on a variety of substrates such that the resulting antistatic articles are suitable for use in optical applications.

SUMMARY

An article comprising an antistatic layer disposed on a substrate is disclosed herein. In one aspect, the article comprises: a substrate and an antistatic layer disposed on the substrate, the antistatic layer comprising a cationic copolymer, a non-cationic (meth)acrylic polymer, and a crosslinking agent. The cationic copolymer consists essentially of: i) from about 20 to less than 70 wt % of a cationic monomer having the formula:

$$CH_2=CR^1COZ(CH_2)_nN(R^2)_3X$$

wherein Z is O, S, or NH; $R^1$ is H or $CH_3$; $R^2$ independently comprises an alkyl group having from 1 to 4 carbon atoms; X is an anion selected from the group consisting of halogen, nitrate, alkylsulfate, alkanesulfonate, and haloalkanesulfonate; and n=2 to 6; and ii) from about 10 to about 75 wt % of a hydrophobic monomer comprising an aliphatic alkyl (meth)acrylate monomer having a hydrocarbon group of from 1 to 12 carbon atoms; and iii) from about 2 to about 25 wt % of a crosslinkable monomer having the formula:

$$CH_2=CR^3Y$$

wherein $R^3$ is H or $CH_3$; and Y is selected from the group consisting of $CO_2M$, $L-CO_2M$, $L-OH$, and $CONH_2$, wherein M is H or a counterion, and L is a divalent linking group comprising alkylene, arylene, heteroalkylene, ether, carbonyl, ester, amido, or sulfonamido functionality, or a combination thereof, b) a non-cationic (meth)acrylic polymer; and c) a crosslinking agent selected from the group consisting of melamine-formaldehyde, urea-formaldehyde, glycoluril-formaldehyde, aziridine, carbodiimide, isocyanate, and epoxy crosslinkers.

In another aspect, the cationic copolymer consists essentially of: i) from about 20 to about 50 wt % of a cationic monomer having the formula:

$$CH_2=CR^1COZ(CH_2)_nN(R^2)_3X$$

wherein Z is O, S, or NH; $R^1$ is H or $CH_3$; $R^2$ independently comprises an alkyl group having from 1 to 4 carbon atoms; X is an anion selected from the group consisting of halogen, nitrate, alkylsulfate, alkanesulfonate, and haloalkanesulfonate; and n=2 to 6; and ii) from about 10 to about 75 wt % of a hydrophobic monomer comprising an aliphatic alkyl (meth)acrylate monomer having a hydrocarbon group of from 1 to 12 carbon atoms; iii) from about 0.5 to about 55 wt % of a nitrogen-containing monomer comprising N-vinylpyrrolidinone, N,N-dimethylaminoethyl (meth)acrylate, or a combination thereof, with the proviso that the amount of cationic monomer and nitrogen-containing monomer is less than about 70 wt %; and iv) from about 2 to about 25 wt % of a crosslinkable monomer comprising (meth)acrylic acid or a monomer having the formula:

$$CH_2=CR^3Y$$

wherein $R^3$ is H or $CH_3$; and Y is selected from the group consisting of $CO_2M$, $L-CO_2M$, $L-OH$, and $CONH_2$, wherein M is H or a counterion, and L is a divalent linking group comprising alkylene, arylene, heteroalkylene, ether, carbonyl, ester, amido, or sulfonamido functionality, or a combination thereof, b) a non-cationic (meth)acrylic polymer; and c) a crosslinking agent selected from the group consisting of melamine-formaldehyde, urea-formaldehyde, glycoluril-formaldehyde, aziridine, carbodiimide, isocyanate, and epoxy crosslinkers.

The article disclosed herein may be used in a variety of constructions, particularly those suitable for optical applications. In some embodiments, the substrate comprises a reflective film, a polarizer film, a reflective polarizer film, a diffuse blend reflective polarizer film, a diffuser film, a brightness enhancing film, a turning film, a mirror film, or a combination thereof. The antistatic layer can also be incorporated as an inner or outer layer of one of these optical films. In one embodiment, the article comprises a microstructured layer disposed on the antistatic layer, wherein the microstructured layer comprises a structured surface having a plurality of microstructures, and the structured surface comprises an outer surface of the article. In another embodiment, the article comprises A) a polarizing film; B) the antistatic layer disposed on the polarizing film; C) an optical film; and D) an adhesive layer that adheres the optical film to the antistatic layer. In another embodiment, the article comprises A) a polarizing film; B) the antistatic layer disposed on the polarizing film; C) an optical film; and D) an adhesive layer that adheres the optical film to the polarizing film.

In another aspect, a method of making the article is disclosed herein. The method comprises coating an antistatic composition disclosed herein on a substrate thereby forming a coated substrate, optionally followed by stretching the coated substrate in at least one direction. In yet another aspect, a display device comprising the article is disclosed herein. The display device comprises a display panel, one or more light sources, and the article.

In yet another aspect, a cationic copolymer is disclosed herein and consists essentially of: i) from about 20 to about 50 wt % of a cationic monomer having the formula:

$$CH_2\!=\!CR^1COZ(CH_2)_nN(R^2)_3X$$

wherein Z is O, S, or NH; $R^1$ is H or $CH_3$; $R^2$ independently comprises an alkyl group having from 1 to 4 carbon atoms; X is an anion selected from the group consisting of halogen, nitrate, alkylsulfate, alkanesulfonate, and haloalkanesulfonate; and n=2 to 6; and ii) from about 10 to about 75 wt % of a hydrophobic monomer comprising an aliphatic alkyl (meth)acrylate monomer having a hydrocarbon group of from 1 to 12 carbon atoms; iii) from about 0.5 to about 55 wt % of a nitrogen-containing monomer comprising N-vinylpyrrolidinone, N,N-dimethylaminoethyl (meth)acrylate, or a combination thereof, with the proviso that the amount of cationic monomer and nitrogen-containing monomer is less than about 70 wt %; and iv) from about 2 to about 25 wt % of a crosslinkable monomer comprising (meth)acrylic acid or a monomer having the formula:

$$CH_2\!=\!CR^3Y$$

wherein $R^3$ is H or $CH_3$; and Y is selected from the group consisting of $CO_2M$, $L\text{-}CO_2M$, L-OH, and $CONH_2$, wherein M is H or a counterion, and L is a divalent linking group comprising alkylene, arylene, heteroalkylene, ether, carbonyl, ester, amido, or sulfonamido functionality, or a combination thereof.

These and other aspects of the invention are described in the detailed description below. In no event should the above summary be construed as a limitation on the claimed subject matter which is defined solely by the claims as set forth herein.

DETAILED DESCRIPTION

The invention provides numerous advantages. For one, the antistatic layer can be used to impart antistatic properties to an article such that the article is antistatic without the need for circuitry (e.g., wires) connected to one or more of its surfaces. Such antistatic articles exhibit sufficient antistatic properties so as to minimize dust, dirt, and other particles from adhering to a surface of the article. The antistatic layer can even be used to impart sufficient antistatic property to optical films used in liquid crystal backlights where removal of protective films from the optical films can generate large static charges and potentials up to 20 kV. In general, antistatic articles can exhibit high resistivity values, e.g., greater than about $1\times 10^8$ ohms/sq or greater than about $1\times 10^{10}$, yet sustain effective antistatic properties. The antistatic articles disclosed herein can have a surface resistivity of less than about $1\times 10^{13}$ ohms/sq, or $1\times 10^{12}$ ohms/sq, preferably less than $1\times 10^{10}$ ohm/sq, when measured at a relative humidity of about 40%. This antistatic performance can be achieved even with layer thicknesses of less than 1 um.

Another advantage is that the antistatic layer can be used to provide an antistatic article exhibiting a fast charge decay time which is the amount of time it takes for a static charge to decay to 10% its initial value over a given range of voltage, e.g., 5000 V to less than 500 V. The antistatic article disclosed herein may exhibit charge decay times of less than about 20 seconds, less than about 10 seconds, less than about 5 seconds, less than about 2 seconds, less than about 0.1 sec, or even less than 0.01 seconds, when measured at a relative humidity of about 40%. In some cases, these charge decay times can be observed when measured at a relative humidity of about 20%.

For clarity, it is noted that although the term "conductive" is often used in the industry to refer to "static dissipative", i.e., antistatic, the terms conductive and antistatic as used herein are not intended to be synonymous. Specifically, a conductive material coating is considered to have a surface resistivity up to $1\times 10^5$ ohms/sq, whereas an antistatic material coating typically has a surface resistivity up to $1\times 10^{12}$ ohms/sq. These terms are generally used to describe materials having a conductive or antistatic component or agent on an exposed surface of the material. (In comparison, an article can be antistatic by having an antistatic layer "buried" between layers having no antistatic properties, even though the article would exhibit higher levels of surface resistivity.) Furthermore, static decay times can be maintained for the article even with these high surface resistivity values.

Another advantage is that the antistatic layer can function as a primer layer that facilitates adhesion between a typical polymeric substrate and another polymeric layer. Particularly advantageous is that the antistatic layer adheres well to optical substrates such as light transmissive substrates, even multilayer optical films as described below. Also particularly advantageous is that the antistatic layer adheres well to layers formed from radiation-cured materials as described below and which are suitable for use in optical applications. Also particularly advantageous is that the antistatic layer adheres well to adhesive layers.

Yet another advantage is that after the antistatic layer is formed on a suitable substrate to provide the antistatic article, the article can then be tentered or stretched in one or two dimensions in order to orient the substrate. This pre-tenter antistat treatment is desirable from a processing standpoint since it eliminates the need for a separate coating step. In contrast, many known materials used to impart antistatic properties, including polymers and particles, are not amenable to tentering, which can include high temperatures and stretch ratios anywhere from 2:1, 4.5:1, or even 6:1 or greater. At the very least, many known materials lose surface resistivity properties after stretching. The antistatic layer disclosed herein can be stretched while still retaining surface resistivity properties.

Yet another advantage is that the antistatic layer can be designed to exhibit desirable optical properties such as haze and light transmission. For example, when the antistatic layer is formed on a suitable substrate, the antistatic article can exhibit minimum haze, such as less than about 20%. This is generally difficult to achieve with known antistatic compositions because, in some cases, sufficient antistatic performance can only be achieved with thick layers that impart undesirable levels of haze. Another source of undesirable haze is surface roughness, which can arise from drying-related phenomena such as mottle and dewetting. This problem can be particularly serious when using water-based coating formulations, due to surface tension gradients that occur during the drying process. If desired, when the antistatic layer is formed on a suitable substrate, the antistatic article can exhibit maximum light transmission, such as greater than 90%. Generally, the antistatic layer is desirably colorless. By having these properties, the antistatic article is suitable for use in optical applications in which light can be managed, enhanced, manipulated, controlled, maintained, transmitted, reflected, refracted, absorbed, etc. Optical applications are described below in more detail.

Still yet another advantage is that antistatic performance for the coatings of this invention can still be adequate at relative humidity as low as 20% and the materials can survive heat treatment even with temperatures of up to about 260° C. Furthermore, antistatic properties can be maintained even after the antistatic layer is overcoated with a radiation-curable composition which is subsequently cured. This is normally a difficult problem to solve as radiation-curable compositions are often 100% monomer and thus can be aggressive toward dissolution of antistatic coatings.

Still yet another advantage is that the components used to form the antistatic layer are compatible, both in the formulation to be coated and in the dried layer. This is not a trivial feat in that compatibility does not readily occur between cationic copolymers and binder materials which often have anionic dispersion packages. Precipitation or gelation often occurs with such combinations. Unexpectedly, it has been found that the aforementioned advantages can be obtained with particular combinations of cationic polymers, binders, and crosslinking agents.

The antistatic layer comprises a cationic copolymer. In general, useful cationic copolymers are those that can be prepared by free radical polymerization of (meth)acryl or vinyl monomers. As used herein, "(meth)acryl" is used to refer to both acryl and methacryl groups and includes compounds such as (meth)acrylates and (meth)acrylamides. Useful cationic copolymers have a number average molecular weight of greater than about 10,000 with lower molecular weight being more desirable than higher molecular weight. Useful cationic copolymers are described in US 2007/0082196 A1 (Ali et al.).

In one embodiment, the cationic copolymer consists essentially of a cationic monomer, a hydrophobic monomer, and a crosslinkable monomer. The cationic monomer has the formula:

$$CH_2=CR^1COZ(CH_2)_nN(R^2)_3X$$

wherein Z is O, S, or NH; $R^1$ is H or $CH_3$; $R^2$ independently comprises an alkyl group having from 1 to 4 carbon atoms; X is an anion selected from the group consisting of halogen, nitrate, alkylsulfate, alkanesulfonate, and haloalkanesulfonate; and n=2 to 6. For example, the cationic monomer may comprise 2-acryloxyethyltrialkylammonium cation and an anion, and preferably, 2-acryloxyethyltrimethylammonium chloride or 2-acryloxyethylbutyldimethylammonium bromide. The cationic monomer comprises from about 20 to less than 70 wt. %, or from about 30 to about 65 wt. %, relative to the total weight of the monomers used to form the cationic copolymer. The cationic monomer may be incorporated into the cationic copolymer to impart antistatic properties. As such, the particular amount of cationic monomer used may depend upon the desired antistatic properties of the copolymer, and also on a variety of other factors including compatibility with the other monomers and other components in the composition used to form the antistatic layer, as well as the antistatic layer after it is formed.

The hydrophobic monomer comprises an aliphatic alkyl (meth)acrylate monomer having a hydrocarbon group of from 1 to 12 carbon atoms. The hydrophobic monomer can be straight-chained, branched, or cyclic, and can optionally be substituted with groups such as aromatic groups, heteroatoms such as O, and heteroatom-containing groups such as —CO—. The hydrophobic monomer can also be free of active hydrogens such as OH, NH, and SH hydrogens. Exemplary hydrophobic monomers include ethyl acrylate, methyl methacrylate, butyl acrylate, iso-octyl (meth)acrylate, or iso-bornyl (meth)acrylate. The hydrophobic monomer comprises from about 10 to less than 75 wt. %, or from about 25 to about 50 wt. %, relative to the total weight of the monomers used to form the cationic copolymer. The particular amount of hydrophobic monomer used may depend upon the desired properties of the copolymer such as compatibility with the other monomers and other components in the composition used to form the antistatic layer, as well as the antistatic layer after it is formed.

The crosslinkable monomer comprises (meth)acrylic acid or a monomer having the formula:

$$CH_2=CR^3Y$$

wherein $R^3$ is H or $CH_3$; and Y is selected from the group consisting of $CO_2M$, $L-CO_2M$, L-OH, and $CONH_2$, wherein M is H or a counterion. The counterion may be selected from the group consisting of alkali metal; ammonium; and substituted mono-, di-, and trialkylammonium bearing alkyl or heteroatom-substituted alkyl groups having from 1 to 4 carbon atoms. L is a divalent linking group comprising alkylene, arylene, heteroalkylene, ether, carbonyl, ester, amido, or sulfonamido functionality, or a combination thereof. Divalent linking groups that are useful as L include alkylene groups having from 2 to 6 carbon atoms. Exemplary crosslinkable monomers include hydroxyethyl (meth)acrylate, N-(methylol)(meth)acrylamide, (meth)acrylic acid, and 2-carboxyethyl (meth)acrylate. The crosslinkable monomer is thought to react with the crosslinking agent which is also present in the antistatic composition. Thus, the particular crosslinkable monomer used may depend on the reactivity of the crosslinking agent. The crosslinkable monomer is present in an amount of from about 2 to about 25 wt %, or from about 5 to about 10 wt. %, relative to the total weight of monomers that make up the cationic copolymer. The particular amount of crosslinkable monomer used may depend upon the desired properties of the copolymer such as compatibility with the other monomers and other components in the composition used to form the antistatic layer, as well as the antistatic layer after it is formed.

The cationic copolymer may consist essentially of particular combinations of cationic, hydrophobic, and crosslinkable monomers. Useful examples of cationic copolymers include those listed in Table 1 below. In one embodiment, the cationic copolymer consists essentially of a copolymer of an alkyl salt of dimethylaminoethyl acrylate; a hydrophobic monomer comprising ethyl acrylate, methyl methacrylate, iso-bornyl acrylate, or a combination thereof, and hydroxyethyl (meth)acrylate. In another embodiment, the cationic copolymer consists essentially of a copolymer of an alkyl salt of dimethylaminoethyl acrylate; the hydrophobic monomer comprises ethyl (meth)acrylate, methyl (meth)acrylate, butyl (meth)acrylate, iso-octyl (meth)acrylate, iso-bornyl (meth)acrylate, or a combination thereof, and the crosslinkable monomer comprises hydroxyethyl (meth)acrylate.

In another embodiment, the cationic copolymer consists essentially of a copolymer of a cationic monomer, a hydrophobic monomer, a nitrogen-containing monomer, and a crosslinkable monomer. In this case, the cationic monomer may comprise any of those described above, except that when used with the nitrogen-containing monomer, it comprises from about 20 to about 50 wt. %, relative to the total weight of the monomers used to form the cationic copolymer. The hydrophobic monomer may comprise any of those described above and may be from about 10 to less than 75 wt. %, or from about 20 to about 35 wt. %, relative to the total weight of the monomers used to form the cationic copolymer. The crosslinkable monomer may comprise any of those described above and may be from about 2 to about 25 wt. %, or from about 5 to about 10 wt. %, relative to the total weight of the monomers used to form the cationic copolymer.

The nitrogen-containing monomer comprises N-vinylpyrrolidinone, N,N-dimethylaminoethyl (meth)acrylate, or a combination thereof. The nitrogen-containing monomer comprises from about 0.5 to about 55 wt. %, or from about 5 to about 35 wt. %, relative to the total weight of the monomers used to form the cationic copolymer, with the proviso that the amount of cationic monomer and nitrogen-containing monomer is less than about 70 wt % relative to the total weight of the monomers used to form the cationic copolymer. The particular amount of nitrogen-containing monomer used may depend upon the desired properties of the copolymer such as compatibility with the other monomers and other components in the composition used to form the antistatic layer, as well as the antistatic layer after it is formed.

The cationic copolymer may consist essentially of particular combinations of cationic, hydrophobic, nitrogen-containing, and crosslinkable monomers. Useful examples of these cationic copolymers include those listed in Table 2 below. In one embodiment, the cationic copolymer consists essentially of a copolymer of an alkyl salt of dimethylaminoethyl acrylate; a hydrophobic monomer comprising ethyl acrylate, methyl methacrylate, butyl methacrylate, iso-octyl acrylate, iso-bornyl (meth)acrylate, or a combination thereof, N-vinylpyrrolidinone, dimethylaminoethyl acrylate, or a combination thereof, and hydroxyethyl (meth)acrylate. In another embodiment, the cationic copolymer consists essentially of a copolymer of an alkyl salt of dimethylaminoethyl acrylate; a hydrophobic monomer comprising phenoxyethyl acrylate, methyl methacrylate, iso-octyl acrylate, iso-bornyl acrylate, or a combination thereof, N-vinylpyrrolidinone, dimethylaminoethyl acrylate, or a combination thereof, and hydroxyethyl (meth)acrylate. In another embodiment, the cationic polymer consists essentially of a copolymer of a cationic monomer comprising an alkyl salt of dimethylaminoethyl acrylate; a hydrophobic monomer comprising ethyl (meth)acrylate, methyl (meth)acrylate, butyl (meth)acrylate, iso-octyl (meth)acrylate, iso-bornyl (meth)acrylate, phenoxyethyl (meth)acrylate, or a combination thereof, N-vinylpyrrolidinone, dimethylaminoethyl acrylate, or a combination thereof, and a crosslinkable monomer comprising hydroxyethyl (meth)acrylate.

In making the cationic copolymer, a typical process would include charging each of the monomers into a reaction vessel along with an initiator and a solvent. A suitable initiator includes 2,2'-azobis(2-methylbutanenitrile) or any of those sold as VAZO products from DuPont Chemicals or as IRGACURE products from Ciba Specialty Chemicals. About 0.1 to 1 part initiator per 100 parts monomer mixture is typically used. Useful solvents would include various alcohols, including but not limited to methanol, ethanol, isopropyl alcohol, ethyl acetate, methyl ethyl ketone, water, and combinations thereof. The system is mixed for a period of time for the reaction to proceed.

The cationic copolymer comprises from about 25 to about 70 wt. %, or from about 33 to about 60 wt. % of the antistatic layer. In most cases, it is desirable to minimize the amount of cationic copolymer in order to minimize cost and any adverse effects on the performance of the article. For example, if the article is an optical article that needs to be colorless, and the cationic copolymer is capable of imparting color to the optical article, then the amount of cationic copolymer should be minimized to the extent that the optical article remains colorless. For another example, if the antistatic layer is disposed between the substrate and some other layer, then the amount of cationic copolymer used should not interfere with adhesion between the substrate and the other layer. ASTM D 3359 is a well known method used to measure adhesion between two layers.

The particular cationic copolymer and amount used will depend upon a variety of factors including other components present in the antistatic layer, the particular substrate, desired antistatic performance, etc. One way of choosing a cationic copolymer is to coat a solution or dispersion of it onto a substrate and then measure the surface resistivity. Ideally, the surface resistivity imparted by the cationic polymer alone is less than about $1 \times 10^{10}$ ohms/sq when measured at a relative humidity of about 40%.

The antistatic layer also comprises a non-cationic (meth)acrylic polymer which functions primarily as a binder and/or primer. This material may be referred to as a latex, dispersion, or emulsion polymer. The non-cationic (meth)acrylic polymer comprises an alkyl (meth)acrylate copolymer or an acrylic core/shell copolymer. Useful alkyl (meth)acrylate copolymers include those utilized in RHOPLEX 3208 and RHOPLEX 3208ER (Rohm and Haas Co.). Useful acrylic core/shell copolymers include a core/shell latex based on isobornyl acrylate/methyl methacrylate/ethyl acrylate copolymerization and prepared using methods described in Example 1 of WO 96/16120 (Rao et al.). Other useful binder polymer systems are those such as described in Ex. 29 of U.S. Pat. No. 6,893,731 (Kausch). The binder polymer(s) may also comprise monomers with crosslinkable functional groups such as —OH and —$CO_2H$. The particular binder and amount used may depend on a variety of factors including compatibility with the other components in the antistatic composition used to form the antistatic layer, as well as the antistatic layer after it is formed. In general, the antistatic layer comprises from about 10 to about 50 wt. % of the non-cationic (meth)acrylic polymer.

The antistatic layer also comprises a crosslinking agent selected from the group consisting of melamine-formaldehyde, urea-formaldehyde, glycoluril-formaldehyde, aziridine, carbodiimide, isocyanate, and epoxy crosslinkers. These crosslinking agents react with the pendant crosslinking groups of the binder and/or cationic copolymer as imparted by the crosslinking monomer. The crosslinking agent is selected to impart integrity and any other desired properties to the antistatic layer. Useful crosslinking agents include CYMEL 323, 325, 327, 350, and 373 (Ciba Specialty Chemicals); CX-100 (DSM Neoresins); and XAMA-7 (Hoechst Celanese). The particular choice of crosslinking agent and the amount used depends on a variety of factors such as compatibility with other components in the layer either before or after it is coated and/or cured, the desired thickness of the layer, polymerization conditions, cost, etc. Accordingly, the crosslinking agent may comprise from about 5 to about 35 wt. % of the antistatic layer.

The relative amounts of the materials used in the antistatic layer will depend upon the particular materials being used, as well as the thickness of the layer, and the intended use of the article. In one embodiment, the antistatic layer comprises: from about 25 to about 70 wt. % of the cationic copolymer; from about 10 to about 50 wt. % of the non-cationic (meth)acrylic polymer; and from about 5 to about 35 wt. % of the crosslinking agent.

The antistatic layer may further comprise at least one catalyst or thermally- and/or photo-activated latent catalyst in order to facilitate curing and crosslinking. Catalytic species can be either acidic or basic, depending on the type of crosslinking chemistry employed in the coating. Examples of useful acid and latent acid catalysts, particularly useful with melamine-formaldehyde-based crosslinkable systems, include p-toluenesulfonic acid and its derivatives, such as CYCAT 4040 and 4045 (Ciba Specialty Chemicals). Other examples of useful catalysts include mineral acids such as hydrochloric, phosphoric, and nitric acids, their amine salts, and carboxylic acids and their amine salts. Catalysts can also be polymeric species such as poly(ethyleneimine) and its salts or poly(acrylic acid) and its ammonium salts. Examples of useful photoactivated acid catalysts include iodonium and sulfonium salts of strong acids such as trifluoromethanesulfonic acid. In general, the amount of catalyst or catalyst precursor used is less than about 5 wt. % of the total coating solids.

The antistatic layer and/or the coating formulation used to apply it may also contain other types of additives. Preferably, such materials should be compatible with the primary components of the coating and coating formulation, and should not adversely affect performance attributes of the optical article. These include coating aids such as surfactants and coalescing solvents; defoaming agents; particulates used as, for instance, slip agents; antioxidants; and pH control agents such as buffers or trialkylamines. Use of relatively volatile trialkylamines such as triethylamine and dimethylethanolamine as pH stabilizers is particularly preferred for coating formulations comprising melamine-formaldehyde crosslinking agents, since pH drift into the acid range can cause undesirable shortened pot life and premature gelation.

The antistatic layer can have any suitable thickness provided it can impart the desired antistatic properties to the article. Generally, a thickness of from about 25 to about 400 nm, preferably from about 50 to about 250 nm, is useful. The antistatic layer should be thick enough to impart desirable properties but not so thick that it would detract from performance of the article.

Also disclosed herein is a method of making the antistatic article. The method comprises coating the antistatic composition described above onto a substrate, thereby forming a coated substrate. Typically, the components in the antistatic composition are dissolved, dispersed, or suspended in a suitable solvent for the coating step. The particular solvent used depends upon the particular components, the desired concentrations of the components, the desired thickness and nature of the layer, the coating method employed, etc. Suitable solvents include water. Generally, compositions used to form the antistatic layer comprise up to about 50 wt. % solids relative to the weight of the total composition.

The antistatic composition may be coated using a variety of coating techniques such as dip, roll, die, knife, air knife, slot, slide, wire wound rod, and curtain coating. A comprehensive discussion of coating techniques can be found in Cohen, E. and Gutoff, E. Modern Coating and Drying Technology; VCH Publishers: New York, 1992; p. 122; and in Tricot, Y-M. Surfactants: Static and Dynamic Surface Tension. In *Liquid Film Coating*; Kistler, S. F. and Schweizer, P. M., Eds.; Chapman & Hall: London, 1997; p. 99.

The antistatic composition can be cured using heat or UV radiation or any other suitable curing technique. Further details concerning free radical curing techniques may be found in, for example, U.S. Pat. Nos. 4,654,233; 4,855,184; and 6,224,949. One preferred method of curing is thermal activation and crosslinking of the antistatic coating using the latent heat of a film tentering process.

The substrate may comprise any of a variety of materials including polyesters such as polyethylene terephthalate, polyethylene naphthalate, copolyesters or polyester blends based on naphthalene dicarboxylic acids; polycarbonates; polystyrenes; styrene-acrylonitriles; cellulose acetates; polyether sulfones; poly(meth)acrylates such as polymethylmethacrylate; polyurethanes; polyvinyl chloride; polycycloolefins; polyimides; glass; paper; or combinations or blends thereof. Particular examples include polyethylene terephthalate, polymethyl methacrylate, polyvinyl chloride, and cellulose triacetate. Preferable examples include polyethylene terephthalate, polyethylene naphthalate, cellulose triacetate, polypropylene, polyester, polycarbonate, polymethylmethacrylate, polyimide, polyamide, or a blend thereof. Preferably, the substrate is sufficiently resistant to temperature and aging such that performance of the antistatic article is not compromised over time. The thickness of the substrate is typically less than about 2.5 mm. The substrate may also be an orientable film such as a cast web substrate that is coated before orientation in a tentering operation.

The substrate may comprise a light transmissive substrate such that the antistatic article is suitable for use in optical applications. Useful light transmissive substrates are optically clear and designed to control the flow of light and may have a transmission of greater than about 90%. The substrate may exhibit minimal haze, having a haze value of less than about 5%, for example, less than 2%, or less than 1%. Properties to consider when selecting a suitable substrate include mechanical properties such as flexibility, dimensional stability, self-supportability, and impact resistance. For example, the substrate may need to be structurally strong enough so that the antistatic article can be assembled as part of a display device.

The substrate may comprise an optical film that is used in a wide variety of applications such as graphic arts and optical applications. A useful optical film may be described as a reflective film, a polarizer film, a reflective polarizer film, a diffuse blend reflective polarizer film, a diffuser film, a brightness enhancing film, a turning film, a mirror film, or a combination thereof. The optical film may comprise a multilayer optical film having ten or less layers, hundreds, or even thousands of layers, the layers being composed of some combination of all birefringent optical layers, some birefringent optical layers, or all isotropic optical layers. In one embodiment, the substrate may be a multilayer optical film having alternating layers of first and second optical layers, wherein the first and second optical layers have refractive indices along at least one axis that differ by at least 0.04. Multilayer optical films having refractive index mismatches are described in the references cited below. In another embodiment, the substrate may comprise one or more layers of any of the above optical films such that the antistatic layer is buried in any one of them, making the article itself a reflective film, a polarizer film, a reflective polarizer film, a diffuse blend reflective polarizer film, a diffuser film, a brightness enhancing film, a turning film, a mirror film, or a combination thereof.

Useful substrates include commercially available optical films marketed as Vikuiti™ Dual Brightness Enhanced Film (DBEF), Vikuiti™ Brightness Enhanced Film (BEF), Vikuiti™ Diffuse Reflective Polarizer Film (DRPF), Vikuiti™ Enhanced Specular Reflector (ESR), and Vikuiti™ Advanced Polarizing Film (APF), all available from 3M Company. Useful optical films are also described in U.S. Pat. Nos. 5,825,543; 5,828,488 (Ouderkirk et al.); U.S. Pat. Nos. 5,867,316; 5,882,774; 6,179,948 B1 (Merrill et al.); U.S. Pat. Nos. 6,352,761 B1; 6,368,699 B1; 6,927,900 B2; 6,827,886 (Neavin et al.); U.S. Pat. No. 6,972,813 B1 (Toyooka); U.S. Pat. No. 6,991,695; 2006/0084780 A1 (Hebrink et al.); 2006/0216524 A1; 2006/0226561 A1 (Merrill et al.); 2007/

0047080 A1 (Stover et al.); WO 95/17303; WO 95/17691; WO95/17692; WO 95/17699; WO 96/19347; WO 97/01440; WO 99/36248; and WO99/36262; all incorporated herein by reference. These optical films are merely illustrative and are not meant to be an exhaustive list of suitable optical films that can be used. In some of these embodiments, the antistatic primer coating of this invention may be an internal layer in a multilayer film construction.

After the antistatic layer is formed on a suitable substrate, the coated substrate can then be tentered or stretched in one or two dimensions in order to orient the substrate. The process of orienting film, particularly polyester films, is described in Volume 12 of *The Encyclopedia of Polymer Science and Engineering,* 2nd edition, pages 193 to 216. A typical process for fabricating biaxially oriented polyester films comprises four main steps: (1) melt extrusion of the polyester resin and quenching it to form a web, (2) drawing the web in the longitudinal or machine direction, (3) subsequently or simultaneously drawing the web in the transverse direction to create a film, and (4) heat setting the film. If biaxial orientation is desired, the antistatic composition may be coated on the substrate after it has been drawn in the machine direction but before it has been subsequently drawn in the transverse direction. Further discussion on the orientation of polymeric films can be found in WO 2006/130142 and the previously cited references on optical films.

The articles described above can be used to make a variety of other articles suitable for use in optical applications such as display devices. In one embodiment, the antistatic layer is disposed on a substrate that is a polarizing film. In another embodiment, the article suitable for use in optical applications comprises: A) a polarizing film; B) an antistatic layer disposed on the polarizing film, the antistatic layer comprising: a) a cationic copolymer consisting essentially of: i) from about 20 to less than 70 wt % of a cationic monomer having the formula:

$$CH_2=CR^1COZ(CH_2)_nN(R^2)_3X$$

wherein Z is O, S, or NH; $R^1$ is H or $CH_3$; $R^2$ independently comprises an alkyl group having from 1 to 4 carbon atoms; X is an anion selected from the group consisting of halogen, nitrate, alkylsulfate, alkanesulfonate, and haloalkanesulfonate; and n=2 to 6; and ii) from about 10 to about 75 wt % of a hydrophobic monomer comprising an aliphatic alkyl (meth)acrylate monomer having a hydrocarbon group of from 1 to 12 carbon atoms; and iii) from about 2 to about 25 wt % of a crosslinkable monomer comprising (meth)acrylic acid or a monomer having the formula:

$$CH_2=CR^3Y$$

wherein $R^3$ is H or $CH_3$; and Y is selected from the group consisting of $CO_2M$, $L-CO_2M$, L-OH, and $CONH_2$, wherein M is H or a counterion, and L is a divalent linking group comprising alkylene, arylene, heteroalkylene, ether, carbonyl, ester, amido, or sulfonamido functionality, or a combination thereof, b) a non-cationic (meth)acrylic polymer; and c) a crosslinking agent selected from the group consisting of melamine-formaldehyde, urea-formaldehyde, glycoluril-formaldehyde, aziridine, carbodiimide, isocyanate, and epoxy crosslinkers; C) an optical film; and D) an adhesive layer that adheres the optical film to the antistatic layer. That is, in this embodiment, the article comprises four layers with the antistatic layer disposed on the polarizing film, the adhesive layer disposed on the antistatic layer opposite the polarizing film, and the optical film disposed on the adhesive layer opposite the antistatic layer.

In another embodiment, the article suitable for use in optical applications comprises: A) a polarizing film; B) an antistatic layer disposed on the polarizing film, the antistatic layer comprising: a) a cationic copolymer consisting essentially of: i) from about 20 to less than 70 wt % of a cationic monomer having the formula:

$$CH_2=CR^1COZ(CH_2)_nN(R^2)_3X$$

wherein Z is O, S, or NH; $R^1$ is H or $CH_3$; $R^2$ independently comprises an alkyl group having from 1 to 4 carbon atoms; X is an anion selected from the group consisting of halogen, nitrate, alkylsulfate, alkanesulfonate, and haloalkanesulfonate; and n=2 to 6; and ii) from about 10 to about 75 wt % of a hydrophobic monomer comprising an aliphatic alkyl (meth)acrylate monomer having a hydrocarbon group of from 1 to 12 carbon atoms; and iii) from about 2 to about 25 wt % of a crosslinkable monomer comprising (meth)acrylic acid or a monomer having the formula:

$$CH_2=CR^3Y$$

wherein $R^3$ is H or $CH_3$; and Y is selected from the group consisting of $CO_2M$, $L-CO_2M$, L-OH, and $CONH_2$, wherein M is H or a counterion, and L is a divalent linking group comprising alkylene, arylene, heteroalkylene, ether, carbonyl, ester, amido, or sulfonamido functionality, or a combination thereof, b) a non-cationic (meth)acrylic polymer; and c) a crosslinking agent selected from the group consisting of melamine-formaldehyde, urea-formaldehyde, glycoluril-formaldehyde, aziridine, carbodiimide, isocyanate, and epoxy crosslinkers; C) an optical film; and D) an adhesive layer that adheres the optical film to the polarizing film. That is, in this embodiment, the article comprises four layers with the antistatic layer disposed on the polarizing film, the adhesive layer disposed on the polarizing film opposite the antistatic layer, and the optical film disposed on the adhesive layer opposite the polarizing film.

In yet another embodiment, an article suitable for use in optical applications comprises: A) a polarizing film; B) an antistatic layer disposed on the substrate, the antistatic layer comprising: a) a cationic copolymer consisting essentially of: i) from about 20 to about 50 wt % of a cationic monomer having the formula:

$$CH_2=CR^1COZ(CH_2)_nN(R^2)_3X$$

wherein Z is O, S, or NH; $R^1$ is H or $CH_3$; $R^2$ independently comprises an alkyl group having from 1 to 4 carbon atoms; X is an anion selected from the group consisting of halogen, nitrate, alkylsulfate, alkanesulfonate, and haloalkanesulfonate; and n=2 to 6; and ii) from about 10 to about 75 wt % of a hydrophobic monomer comprising an aliphatic alkyl (meth)acrylate monomer having a hydrocarbon group of from 1 to 12 carbon atoms; iii) from about 0.5 to about 55 wt % of a nitrogen-containing monomer comprising N-vinylpyrrolidinone, N,N-dimethylaminoethyl (meth)acrylate, or a combination thereof, with the proviso that the amount of cationic monomer and nitrogen-containing monomer is less than about 70 wt %; and iv) from about 2 to about 25 wt % of a crosslinkable monomer comprising (meth)acrylic acid or a monomer having the formula:

$$CH_2=CR^3Y$$

wherein $R^3$ is H or $CH_3$; and Y is selected from the group consisting of $CO_2M$, $L-CO_2M$, L-OH, and $CONH_2$, wherein M is H or a counterion, and L is a divalent linking group comprising alkylene, arylene, heteroalkylene, ether, carbonyl, ester, amido, or sulfonamido functionality, or a combination thereof, b) a non-cationic (meth)acrylic polymer; c) a crosslinking agent selected from the group consisting of melamine-formaldehyde, urea-formaldehyde, glycoluril-formaldehyde, aziridine, carbodiimide, isocyanate, and epoxy crosslinkers; C) an optical film; and D) an adhesive layer that adheres the optical film to the antistatic layer. That is, in this embodiment, the article comprises four layers with the antistatic layer disposed on the polarizing film, the adhesive layer disposed on the antistatic layer opposite the polarizing film, and the optical film disposed on the adhesive layer opposite the antistatic layer.

In still yet another embodiment, an article suitable for use in optical applications comprises: A) a polarizing film; B) an antistatic layer disposed on the substrate, the antistatic layer comprising: a) a cationic copolymer consisting essentially of: i) from about 20 to about 50 wt % of a cationic monomer having the formula:

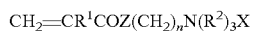

wherein Z is O, S, or NH; $R^1$ is H or $CH_3$; $R^2$ independently comprises an alkyl group having from 1 to 4 carbon atoms; X is an anion selected from the group consisting of halogen, nitrate, alkylsulfate, alkanesulfonate, and haloalkanesulfonate; and n=2 to 6; and ii) from about 10 to about 75 wt % of a hydrophobic monomer comprising an aliphatic alkyl (meth)acrylate monomer having a hydrocarbon group of from 1 to 12 carbon atoms; iii) from about 0.5 to about 55 wt % of a nitrogen-containing monomer comprising N-vinylpyrrolidinone, N,N-dimethylaminoethyl (meth)acrylate, or a combination thereof, with the proviso that the amount of cationic monomer and nitrogen-containing monomer is less than about 70 wt %; and iv) from about 2 to about 25 wt % of a crosslinkable monomer comprising (meth)acrylic acid or a monomer having the formula:

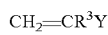

wherein $R^3$ is H or $CH_3$; and Y is selected from the group consisting of $CO_2M$, L-$CO_2M$, L-OH, and $CONH_2$, wherein M is H or a counterion, and L is a divalent linking group comprising alkylene, arylene, heteroalkylene, ether, carbonyl, ester, amido, or sulfonamido functionality, or a combination thereof, b) a non-cationic (meth)acrylic polymer; c) a crosslinking agent selected from the group consisting of melamine-formaldehyde, urea-formaldehyde, glycoluril-formaldehyde, aziridine, carbodiimide, isocyanate, and epoxy crosslinkers; C) an optical film; and D) an adhesive layer that adheres the optical film to the polarizing film. That is, in this embodiment, the article comprises four layers with the antistatic layer disposed on the polarizing film, the adhesive layer disposed on the polarizing film opposite the antistatic layer, and the optical film disposed on the adhesive layer opposite the polarizing film.

Any type of polarizer film can be used to make the articles suitable for use in optical applications as long as some polarization of light is observed for light passing through the film. Examples include single layer and multilayer optical films such as reflective polarizer films or diffuse blend reflective polarizer films as well as any of the aforementioned Vikuiti™ films from 3M Company.

The optical film can comprise a light transmissive polymeric film; examples include polyesters such as polyethylene terephthalate or polyethylene naphthalate; cellulose acetates including cellulose acetate butyrate, cellulose acetate propionate, or cellulose triacetate; polycarbonates; polyacrylates such as polymethacrylate; polyolefins such as polyethylene, polypropylene, and cyclic olefins; polyvinyl chloride; polyether sulfones; polyurethanes; syndiotactic polystyrene; polyimides, polyamides, or copolymers and blends thereof. Examples also include single layer and multilayer films as well as any of the aforementioned Vikuiti™ films from 3M Company. The optical film may comprise any of those described above for substrates; for example, the optical film may comprise a prism film, a diffusive film, a light guide, or a combination thereof.

The adhesive layer bonds the polarizer and optical films. Preferable adhesives used to form the adhesive layer include optical grade adhesives that have little or no effect on the optical performance of the final article either initially or after a period of aging. For example, it may be desirable for the adhesive to be stable enough such that it does not yellow with time or exposure to harsh operating conditions. The adhesive is selected to provide a minimum bond strength or a range of bond strengths between the polarizing film and optical film depending on the particular application. One suitable method of evaluating bond strength is described in ASTM D 3359 and uses a crosshatch tape pull test with 3M™ 610 cellophane tape from 3M Company. In general, improvements in adhesion are desired and delamination of the layers is not desired.

In one embodiment, the adhesive layer comprises a UV-curable adhesive comprising at least one nitrogen-containing polymer and at least one polymerizable ethylenically unsaturated diluent as described in US 2006/0029784 A1 (Doan et al.) incorporated herein by reference. Other exemplary adhesives are described in U.S. 2003/0012936 A1. Commercially available adhesives may also be used such as adhesives available from 3M Company under the trade designations 8141, 8142, and 8161, and adhesives available from Toagosei under the trade designations UVX-2884 and UVX-1962. The adhesive layer may also comprise hydrogenated block copolymers such as KRATON copolymers available from Kraton Polymers, for example, KRATON G-1657. Other exemplary adhesives include acrylic-based, urethane-based, silicone-based, and epoxy-based adhesives. The adhesive can be applied using a variety of known coating techniques such as transfer coating, knife coating, spin coating, die coating and the like.

Other articles suitable for use in optical applications include brightness enhancing films. In one embodiment, a microstructured layer is disposed on the antistatic layer opposite the substrate, wherein the microstructured layer comprises a structured surface having a plurality of microstructures, and the structured surface comprises an outer surface of the article. The microstructured layer may comprise a plurality of microstructures on an outer surface thereof such that the brightness enhancing film is capable of directing light. Examples of brightness enhancing films include the Vikuiti™ BEF family of prismatic films available from 3M Company.

The plurality of microstructures may comprise an array of prisms; a series of shapes including ridges, posts, pyramids, hemispheres and cones; and/or they may be protrusions or depressions having flat, pointed, truncated, or rounded parts; any of which may have angled or perpendicular sides relative to the plane of the surface. Any lenticular microstructure may be useful, for example, the microstructured surface may comprise cube corner elements, each having three mutually substantially perpendicular optical faces that typically intersect at a single reference point or apex. The microstructured surface may have a regularly repeating pattern, be random, or a combination thereof. In general, each microstructure has at least two lateral dimensions (i.e. dimensions in the plane of the film) less than 2 mm. The thickness of the microstructured layer can be from about 10 to about 200 um.

The microstructured layer may be prepared using a polymerizable composition, a master having a negative microstructured molding surface, and the antistatic article. The polymerizable composition can be deposited between the master and the antistatic layer of the antistatic article, and a bead of the composition moved so that the composition fills the microstructures of the master. The polymerizable composition is polymerized to form the layer and is then separated from the master. The master can be metallic, such as nickel, nickel-plated copper or brass, or can be a thermoplastic material that is stable under the polymerizing conditions and that preferably has a surface energy that permits clean removal of the polymerized layer from the master. The master is further described in U.S. Pat. No. 4,542,449; U.S. Pat. No. 5,771,328; and U.S. Pat. No. 6,354,709. Alternatively, a pre-formed microstructured layer may be prepared and laminated to the antistatic article such that the antistatic layer is disposed between the microstructured layer and the substrate.

The article may be used in a graphic arts application, for example, in backlit signs, billboards, and the like. The article may also be used in a display device comprising, at the very least, one or more light sources and a display panel. The display panel may be of any type capable of producing images, graphics, text, etc., and may be mono- or polychromatic, or transmissive or reflective. Examples include a liquid crystal display panel, a plasma display panel, or a touch screen. The light sources may comprise fluorescent lamps, phosphorescent lights, light emitting diodes, or combinations thereof. Examples of display devices include televisions, monitors, laptop computers, and handheld devices such as cell phones, PDA's, calculators, and the like.

The invention may be more completely understood in consideration of the following examples.

EXAMPLES

Materials

All chemicals were obtained from commercial sources and used as received unless otherwise noted. 2-Acryloyloxyethyltrimethylammonium chloride was obtained from Ciba Specialty Chemicals as an 80 wt % solution in water. All other acrylic monomers and lithium nitrate were obtained from Aldrich Chemical Co. TOMADOL 25-9 was obtained from Tomah Reserve, Inc. CYCAT 4040 and 4045, CYMEL 327 and 373, and CYASTAT 609 were obtained from Cytec Industries Inc. Single-side primed PET film of 5 mil thickness was obtained from DuPont Co. as MELINIX 618. Triethylammonium p-toluenesulfonate was prepared by neutralization of an aqueous solution of p-toluenesulfonic acid with triethylamine, both from Aldrich Chemical Co. Lithium bis(trifluoromethanesulfonyl)imide was obtained as 3M FLUORAD Lithium HQ-115 from 3M Co. Lithium methanesulfonate, lithium p-toluenesulfonate, and lithium poly(styrenesulfonate) were prepared by neutralization of the corresponding sulfonic acids, obtained from Aldrich Chemical Co., with lithium hydroxide in aqueous solution.

Binder 1 comprised RHOPLEX 3208 or 3208ER aqueous acrylic dispersions which were obtained from Rohm and Haas Co. These dispersions comprised about 34-35 wt % of an acrylic binder, and about 8-9 wt % of a formaldehyde-melamine crosslinking agent. For the layer compositions described in the tables below, the amounts given for Binder 1 are for the acrylic binder only; the formaldehyde-melamine crosslinking agent is included in the crosslinking agent amounts. Binder 2 was a core/shell latex based on isobornyl acrylate/methyl methacrylate/ethyl acrylate copolymerization and was prepared using methods described in Example 1 of WO 96/16120 (Rao et al.).

Cationic polymers shown in Tables 1 and 2 were prepared according to the following general procedure. In a clean reaction vessel were taken 100 parts of the desired monomer mixture, VAZO-67 initiator from DuPont Co. (0.5 parts based on monomer concentration), and isopropyl alcohol (200 parts). The solution was purged with nitrogen for 2 minutes. The vessel was sealed and maintained at 65° C. in a constant-temperature rotating device for 18 hours during which time a viscous polymer solution was formed. The polymer vessel was removed from the bath and cooled to room temperature. Percent solids analysis was done for the completion of the reaction and it revealed a quantitative conversion to polymer. For many of the copolymers, solvent was removed by rotary evaporation, and deionized water was added to adjust the solids content to approximately 33 wt %.

The following abbreviations are used:

| | |
|---|---|
| AA | acrylic acid |
| AETMAC | 2-acryloyloxyethyltrimethylammonium chloride |
| AEBDMAB | 2-acryloyloxyethylbutyldimethylammonium bromide |
| AEHDMAB | 2-acryloyloxyethylhexyldimethylammonium bromide |
| BA | butyl acrylate |
| DMAEA | dimethylaminoethyl acrylate |
| EA | ethyl acrylate |
| HEA | 2-hydroxyethyl acrylate |
| HEMA | 2-hydroxyethylmethacrylate |
| IBOA | isobornyl acrylate |
| IBOMA | isobornyl methacrylate |
| IOA | isooctyl acrylate |
| MMA | methyl methacrylate |
| NVP | N-vinylpyrrolidinone |
| PEA | phenoxyethyl acrylate |

TABLE 1

| Cationic Copolymer | AETMAC | Hydrophobic Monomer | HEMA |
|---|---|---|---|
| P7 | 10 | 30 IBOA | 10 |
| | | 50 EA | |
| P8 | 10 | 50 IBOA | 10 |
| | | 30 EA | |
| P6 | 20 | 30 IBOA | 20 |
| | | 30 EA | |
| P9 | 20 | 30 IBOA | 10 |
| | | 40 EA | |
| P1 | 40 | 30 IBOA | 5 |
| | | 25 EA | |
| P19 | 40 | 40 EA | 20 |
| P63 | 40 | 25 IBOA | 15[1] |
| | | 20 EA | |
| P39 | 55 | 40 EA | 5 |
| P53 | 55 | 40 MMA | 5 |
| P12 | 60 | 35 EA | 5 |
| P21 | 60 | 20 EA | 20 |
| P62 | 60 | 35 MMA | 5 |
| P42 | 62.5 | 32.5 EA | 5 |
| P56 | 62.5 | 32.5 MMA | 5 |
| P38 | 70 | 25 EA | 5 |
| P52 | 70 | 25 MMA | 5 |
| P64 | 40 | 30 IBOA | 5[2] |
| | | 25 EA | |
| P65 | 40[3] | 30 IBOA | 5[2] |
| | | 25 EA | |
| P66 | 40[4] | 30 IBOA | 5[2] |
| | | 25 EA | |

[1]HEA instead of HEMA
[2]AA instead of HEMA
[3]AEBDMAB instead of AETMAC
[4]AEHDMAB instead of AETMAC

TABLE 2

| Cationic Copolymer | AETMAC | Hydrophobic Monomer | NVP | HEMA |
|---|---|---|---|---|
| P24 | 20 | 40 EA | 20 | 20 |
| P20 | 20 | 40 EA | 35 | 5 |
| P15 | 20 | 20 EA | 40 | 20 |
| P17 | 20 | 27.5 EA | 47.5 | 5 |
| P27 | 20 | 15 EA | 60 | 5 |
| P23 | 34.2 | 14.2 EA | 43.2 | 8.4 |
| P16 | 37.5 | 40 EA | 17.5 | 5 |
| P35 | 40 | 40 EA | 15 | 5 |
| P45 | 40 | 40 EA | 15 | 5 |
| P48 | 40 | 40 MMA | 15 | 5 |
| P59 | 40 | 40 MMA | 15 | 5 |
| P25 | 40 | 20 EA | 20 | 20 |
| P40 | 40 | 32.5 EA | 22.5 | 5 |
| P54 | 40 | 32.5 MMA | 22.5 | 5 |
| P3 | 40 | 25 EA | 30 | 5 |
| P29 | 40 | 25 BA | 30 | 5 |
| P30 | 40 | 25 IBOA | 30 | 5 |
| P31 | 40 | 25 IBOMA | 30 | 5 |
| P32 | 40 | 25 IOA | 30 | 5 |
| P33 | 40 | 25 MMA | 30 | 5 |
| P34 | 40 | 25 EA | 30 | 5[1] |
| P50 | 40 | 25 MMA | 30 | 5 |
| P37 | 45 | 20 EA | 30 | 5 |
| P51 | 45 | 20 MMA | 30 | 5 |
| P43 | 47.5 | 40 EA | 7.5 | 5 |
| P57 | 47.5 | 40 MMA | 7.5 | 5 |
| P44 | 53.3 | 28.3 EA | 13.3 | 5 |
| P47 | 53.3 | 28.3 EA | 13.3 | 5 |
| P58 | 53.3 | 28.3 MMA | 13.3 | 5 |
| P61 | 53.3 | 28.3 MMA | 13.3 | 5 |
| P41 | 57.5 | 20 EA | 17.5 | 5 |
| P55 | 57.5 | 20 MMA | 17.5 | 5 |
| P18 | 60 | 17.5 EA | 17.5 | 5 |
| P36 | 70 | 20 EA | 5 | 5 |
| P46 | 70 | 20 EA | 5 | 5 |
| P49 | 70 | 20 MMA | 5 | 5 |
| P60 | 70 | 20 MMA | 5 | 5 |
| P2 | 40 | 30 IOA 15 PEA | 10[2] | 5 |
| P4 | 30 | 40 MMA 15 PEA | 10[2] | 5 |
| P5 | 30 | 40 IBOA 15 PEA | 10[2] | 5 |
| P10 | 10 | 40 IOA 20 PEA | 20[2] | 10 |
| P11 | 18.2 | 36.3 IOA 18.2 PEA | 18.2[2] | 9.1 |
| P13 | 60 | 0 | 20 | 20 |
| P14 | 60 | 0 | 35 | 5 |
| P22 | 20 | 0 | 60 | 20 |
| P26 | 40 | 0 | 40 | 20 |
| P28 | 35 | 0 | 60 | 5 |

[1]HEA instead of HEMA
[2]DMAEA instead of NVP

Coating Method A

Formulations described below were coated using a #6 wire-wound rod at 41.3 cm/sec (81.3 ft/min) on freshly extruded PET film after length orienting. Polyethylene terephthalate resin (Invista) was extruded onto a casting wheel, then length oriented at a draw ratio of 3.34:1. After coating, the film entered a drying oven set at 54° C. Dwell time in the drying oven was 22 sec. The film went from the drying oven into a tenter, which was divided into three zones—preheat, stretch, and heat set. Temperatures and dwell times, respectively, for the three zones were as follows: Preheat 93° C., 12 sec; Stretch 104° C., 18 sec; Heat Set 232° C., 15 sec. Tranverse draw ratio in the stretch zone was 4.37:1, yielding a final PET film thickness of 51 um (2 mil).

Coating Method B

Formulations described below were coated using a #6 wire-wound rod at 60 cm/sec (118 ft/min) on freshly extruded PET film. Polyethylene terephthalate resin (Invista) was extruded onto a casting wheel, then length oriented at a draw ratio of 3.33:1. After coating, the film went directly into a tenter, which was divided into three zones—preheat, stretch, and heat set. Temperatures and dwell times, respectively, for the three zones were as follows: Preheat 96° C., 8 sec; Stretch 96° C., 13 sec; Heat Set 232° C., 11 sec. Tranverse draw ratio in the stretch zone was 3.62:1, yielding a final PET film thickness of 51 um (2 mil).

Coating Method C

Formulations described below were coated using a #6 wire-wound rod at 20 cm/sec (38.8 ft/min) on a substrate comprising a freshly extruded multilayer optical film. The multilayer optical film was prepared according to methods described in U.S. Pat. No. 6,179,948 B1 (Merrill et al.); U.S. Pat. No. 6,827,886 (Neavin et al.); 2006/0084780 A1 (Hebrink et al.); 2006/0226561 A1 (Merrill et al.); and 2007/0047080 A1 (Stover et al.). The multilayer optical film comprised a skin layer consisting of a 85:15 (w/w) blend of SA115 polycarbonate resin and PETg 6763 resin (both available from Eastman Chemical). The optical stack contained alternating birefringent layers made from a 90:10 (w/w) blend of PEN:PET resins and isotropic layers made from a 70:30 (w/w) blend of PETg 6763 resin and PEN:PET resin. Immediately after coating, the film passed into a tenter that was divided into three zones—preheat, stretch, and heat set. Temperatures and dwell times, respectively, for the three zones were as follows: Preheat 139° C., 25 sec; Stretch 139° C., 49 sec; Heat Set 170° C., 21 sec. Tranverse draw ratio in the stretch zone was 7.24:1, yielding a final substrate thickness of 43 um (1.7 mil).

Formation of Radiation-Cured Layer

After heat setting as described in Methods A, B and C, samples were overcoated with a radiation-curable composition as described in US 2006/0004166 A1 (Olsen et al.) and containing a first monomer comprising a major portion of 2-propenoic acid; (1-methylethylidene)bis[(2,6-dibromo-4,1-phenylene)oxy(2-hydroxy-3,1-propanediyl)]ester; pentaerythritol tri(meth)acrylate; and phenoxyethyl (meth)acrylate. The resin also contained 0.35 wt % DAROCUR 1173 and 0.1 wt % TPO as photoinitiators. This composition was then coated and cured using the following procedure:

1) Heat the resin at 60° C. for 1 hr until liquefied.
2) Heat an unpatterned flat stainless steel tool on a hot plate at 100° C. In some examples (as noted), a microstructured tool prepared as described in U.S. Pat. No. 5,771,328 was used in place of the unpatterned tool.
3) Heat a PL1200 laminator (Professional Laminating Systems, Inc.) to ~70° C. and set speed to 5.1 mm/sec (12 in/min) (setting #2.)
4) Apply a bead line of radiation-curable resin to the tool.
5) Using a hand roller, gently place the coated side of the PET film against the tool and roll to tack in place.
6) Sandwich the tool+film sample between two larger pieces of unprimed PET film to protect the laminator rolls.
7) Run sample through the laminator. This gives a total resin film thickness of 25 um (1 mil).
8) Pass sample twice through a UV processor (UV Fusion Lighthammer equipped with a D bulb and operating at 100% power and 10 cm/sec (20 ft/min) line speed under nitrogen purging).

9) Gently remove film sample from tool.

Test Methods

Surface resistivities were measured using two different devices. One device was the Prostat® PRS-801 Resistance System Set from Prostat® Corp. which was equipped with a PRF-911 concentric ring fixture. Surface resistivities in ohms were converted to ohms/sq by multiplying the measured values by 10 according to the documentation supplied with the instrument. The other device was the Model 880 Autoranging Resistance Indicator from Electro-Tech Systems, Inc. that outputs values in decades. In all cases, surface resistivity measurements were measured on samples before application and curing of the radiation-curable resin. If not otherwise specified, surface resistivity measurements were made at ambient laboratory humidity of 30-40% relative humidity (RH).

Static charge decay times were measured using the Model 406 C Static Decay Meter from Electro-Tech Systems, Inc. This instrument charges the sample to 5 kV and measures the time required for the static charge to decay to 10% of its initial value. Some insulating samples would not charge fully to 5 kV, and this is noted in the data tables with the designation "WNC". Static charge decay measurements were measured on samples after application and curing of the radiation-curable resin. If not otherwise specified, static charge decay measurements were made at ambient laboratory humidity of 30-40% relative humidity (RH).

Haze measurements were performed using a Hazegard® Plus Hazemeter from BYK-Gardner USA. Haze was measured prior to application and curing of the radiation-curable resin.

Adhesion was measured according to ASTM D 3359, a crosshatch tape pull test using 3M™ 610 cellophane tape from 3M Company. Ratings were on a scale of 0-5 with 5 being perfect adhesion and 0 being complete delamination. Occasionally, samples gave delamination upon attempted removal of the metal tool, resulting in the cured resin layer remaining on the tool instead of the coated film. Samples exhibiting this behavior were rated 0*.

Examples 1-4 and Comparative Examples 1-3
(C1-C3)

Coating formulations containing 4 wt % cationic polymer in deionized water were coated on unprimed 5 mil PET film using a #3 wire-wound rod. The coated films were then dried in a forced-air oven at 100° C. for 3 min. Surface resistivity was measured on the resulting coatings; results are shown in Table 3.

Examples 5 and 6 and Comparative Examples 4-6
(C4-C6)

A series of coating formulations was prepared containing 4 wt % Binder 1 (diluted from 44 wt % solids raw material), 0.1 wt % TERGITOL TMN-6, and 0-4 wt. % P1. The amounts of P1 used in the coating formulations were 4.0 wt. % for Example 5, 2.0 wt. % for Example 6, 1.0 wt. % for C4, and 0.4 wt. % for C5. The coating formulations were then coated on unprimed 5 mil PET film using a #6 wire-wound rod. The coated films were then dried in a forced-air oven at 150° C. for 15 min. Surface resistivity was measured on the resulting coatings; layer compositions and results are shown in Table 4.

TABLE 4

| Ex. | P1 (wt %) | Binder 1 (wt %) | XL (wt %) | Surfactant (wt %) | Surface Resistivity (ohm/sq) |
|---|---|---|---|---|---|
| 5 | 50 | 39 | 10 | 1 | $2.1 \times 10^{11}$ |
| 6 | 33 | 53 | 13 | 1 | $4.3 \times 10^{12}$ |
| C4 | 20 | 63 | 16 | 1 | $3.8 \times 10^{13}$ |
| C5 | 9 | 71 | 18 | 2 | $4.7 \times 10^{13}$ |
| C6 | 0 | 73 | 24 | 3 | $1.2 \times 10^{14}$ |

Examples 7-15 and Comparative Examples 7 and 8
(C7 and C8)

Cationic polymers were used to prepare aqueous coating formulations containing 5.0 wt % cationic polymer, 5.0 wt % RHOPLEX 3208 solids, 2.5 wt % CYMEL 327, 0.1 wt % TOMADOL 25-9, and 0.03 wt % CYCAT 4045 solids. Formulations for Examples 7, 10, and 12 were coated and dried according to Coating Method A to give coatings containing 40 wt % cationic copolymer, 32 wt % acrylic binder, and 28 wt % crosslinking resin. Formulations for Examples 8, 9, 11, 13-15, C7, and C8 were coated and dried according to Coating Method B to give coatings containing 40 wt % cationic copolymer, 32 wt % acrylic binder, and 28 wt % crosslinking resin. After haze and surface resistivity were measured, the samples were overcoated with the radiation-curable composition which was then cured using the above procedure except using a microstructured tool prepared as described in U.S. Pat. No. 5,771,328. Charge decay and resin adhesion were then measured; results are shown in Table 5.

TABLE 3

| Ex. | Cat. Pol. | AETMAC (wt %) | Hyd. Mon. (wt %) | DMAEA (wt %) | AETMAC + DMAEA (wt %) | HEMA (wt %) | SR (ohm/sq) |
|---|---|---|---|---|---|---|---|
| 1 | 1 | 40 | 55 | 0 | — | 5 | $6.7 \times 10^9$ |
| 2 | 6 | 20 | 60 | 0 | — | 20 | $5.0 \times 10^{11}$ |
| 3 | 9 | 20 | 70 | 0 | — | 10 | $8.5 \times 10^{11}$ |
| 4 | 11 | 18.2 | 54.5 | 18.2 | 36.4 | 9.1 | $1.1 \times 10^{11}$ |
| C1 | 8 | 10 | 80 | 0 | — | 10 | $1.8 \times 10^{12}$ |
| C2 | 7 | 10 | 80 | 0 | — | 10 | $1.3 \times 10^{14}$ |
| C3 | 10 | 10 | 60 | 20 | 30 | 10 | $6.0 \times 10^{12}$ |

TABLE 5

| Ex. | Cationic Copoly. | AETMAC (wt %) | Hydrophobic Mon. (wt %) | HEMA (wt %) | Haze (%) | Surface Resistivity (ohm/sq) | Charge Decay (sec) | Resin Adhesion |
|---|---|---|---|---|---|---|---|---|
| 7 | P19 | 40 | 40 EA | 20 | 1.7 | $1.3 \times 10^{11}$ | 0.04 | 3 |
| 8 | P39 | 55 | 40 EA | 5 | 0.5 | NM[1] | 0.01 0.23[2] | 1 |
| 9 | P53 | 55 | 40 MMA | 5 | 2.9 | NM | 0.01 0.62[2] | 4 |
| 10 | P12 | 60 | 35 EA | 5 | 2.6 | $2.0 \times 10^{9}$ | 0.015 | 5 |
| 11 | P12 | 60 | 35 EA | 5 | 1.0 | NM | 0.01 0.10[2] | 3 |
| 12 | P21 | 60 | 20 EA | 20 | 12 | $5.8 \times 10^{9}$ | 0.03 | 4 |
| 13 | P62 | 60 | 35 MMA | 5 | 5.2 | NM | 0.01 0.21[2] | 3 |
| 14 | P42 | 62.5 | 32.5 EA | 5 | 3.5 | NM | 0.01 0.07[2] | 5 |
| 15 | P56 | 62.5 | 32.5 MMA | 5 | 15.1 | NM | 0.01 0.13[2] | 4 |
| C7 | P38 | 70 | 25 EA | 5 | 24.3 | NM | 0.01 0.04[2] | 5 |
| C8 | P52 | 70 | 25 MMA | 5 | 39.9 | NM | 0.01 0.05[2] | 4 |

[1]not measured
[2]measured at 20% RH

Examples 16-29 and Comparative Examples 9-11 (C9-C11)

Cationic polymer P3, Binder 1, and Binder 2 were used to prepare aqueous coating formulations described in Table 6. In some examples, additional crosslinking agents 0.4 wt % CYMEL 327 and 0.4 wt % CYMEL 373 (total 0.8 wt %) were added to the formulations. Each example also contained 0.1 wt % TERGITOL TMN-6 and 0.04 wt % triethylammonium p-toluenesulfonate. The formulations were coated on unprimed 5 mil PET film using a #6 wire-wound rod. The coated films were then dried in a forced-air oven at 150° C. for 15 min. After surface resistivity was measured, the samples were overcoated with the radiation-curable composition which was then cured. Charge decay and resin adhesion were then measured; layer compositions and results are shown in Table 7.

TABLE 6

| Ex. | P3 (wt %) | Binder 1 (wt %) | Binder 2 (wt %) | XL (wt %) | LiNO₃ (wt %) |
|---|---|---|---|---|---|
| 16 | 2 | 1.6 | 0 | 0.4 + 0.8 | 0 |
| 17 | 2 | 1.6 | 0 | 0.4 | 0 |
| 18 | 4 | 1.6 | 0 | 0.4 + 0.8 | 0 |
| 19 | 4 | 1.6 | 0 | 0.4 | 0 |
| 20 | 3 | 2.4 | 0 | 0.6 + 0.8 | 0 |
| 21 | 3 | 2.4 | 0 | 0.6 | 0 |
| 22 | 4.5 | 1.2 | 0 | 0.3 + 0.8 | 0 |
| 23 | 4.5 | 0 | 1.5 | 0.8 | 0 |
| 24 | 3 | 0 | 3 | 0.8 | 0 |
| 25 | 4 | 0 | 2 | 0.8 | 0 |
| 26[1] | 3 | 2.4 | 0 | 0.6 + 0.8 | 0.4 |
| 27[2] | 3 | 2.4 | 0 | 0.6 + 0.8 | 0.8 |
| 28 | 2 | 3.2 | 0 | 0.8 + 0.8 | 0 |
| 29[1] | 2 | 3.2 | 0 | 0.8 + 0.8 | 0.4 |
| C9[1] | 0 | 4.8 | 0 | 2.0 | 0.4 |
| C10 | 0 | 4.8 | 0 | 2.0 | 0 |
| C11 | 0 | 0 | 6 | 0.8 | 0 |

TABLE 7

| Ex. | P3 (wt %) | Binder 1 (wt %) | Binder 2 (wt %) | XL (wt %) | SR (ohm/sq) | CD (sec) | Resin Adhesion |
|---|---|---|---|---|---|---|---|
| 16 | 40 | 32 | 0 | 24 | $1.1 \times 10^{12}$ | 1.00 | 3-4 |
| 17 | 48 | 39 | 0 | 10 | $7.5 \times 10^{10}$ | 0.85 | 5 |
| 18 | 58 | 23 | 0 | 17 | $5.3 \times 10^{10}$ | 0.06 | 5 |
| 19 | 65 | 26 | 0 | 7 | $5.9 \times 10^{9}$ | 0.05 | 4-5 |
| 20 | 43 | 35 | 0 | 20 | $1.5 \times 10^{12}$ | 0.54 | 3-4 |
| 21 | 49 | 39 | 0 | 10 | $3.7 \times 10^{10}$ | 0.16 | 5 |
| 22 | 65 | 17 | 0 | 16 | $9.0 \times 10^{9}$ | 0.02 | 5 |
| 23 | 65 | 0 | 22 | 12 | $6.5 \times 10^{9}$ | 0.82 | 5 |
| 24 | 43 | 0 | 43 | 12 | $6.9 \times 10^{9}$ | 0.04 | 4 |
| 25 | 58 | 0 | 29 | 12 | $1.9 \times 10^{9}$ | 0.02 | 4 |
| 26[1] | 41 | 33 | 0 | 19 | $5.9 \times 10^{10}$ | 0.08 | 3-4 |
| 27[2] | 39 | 31 | 0 | 18 | $2.5 \times 10^{9}$ | 0.02 | 1 |
| 28 | 29 | 46 | 0 | 23 | $3.2 \times 10^{12}$ | 6.94 | 5 |
| 29[1] | 27 | 44 | 0 | 22 | $1.5 \times 10^{11}$ | 0.02 | 4 |
| C9[1] | 0[1] | 65 | 0 | 27 | $1.3 \times 10^{13}$ | >30 | 0 |
| C10 | 0 | 69 | 0 | 29 | $4.7 \times 10^{14}$ | >30 | 5 |
| C11 | 0 | 0 | 86 | 12 | $4.8 \times 10^{13}$ | >30 | 5 |

[1]also contained 5 wt % LiNO₃
[2]also contained 10 wt % LiNO₃

Examples 30-41 and Comparative Examples 12-15 (C12-C15)

Cationic polymers P4 and P5, Binder 1, and Binder 2 were used to prepare aqueous coating formulations described in Table 8. In some examples, additional crosslinking agents 0.4 wt % CYMEL 327 and 0.4 wt % CYMEL 373 (total 0.8 wt %) were added to the formulations. Each example also contained 0.1 wt % TERGITOL TMN-6 and 0.04 wt % triethylammonium p-toluenesulfonate. The formulations were coated on unprimed 5 mil PET film using a #6 wire-wound rod. The coated films were then dried in a forced-air oven at 150° C. for 15 min. After surface resistivity was measured, the samples were overcoated with the radiation-curable composition which was then cured. Charge decay and resin adhesion were then measured; layer compositions and results are shown in Table 9.

TABLE 8

| Ex. | Cat. Pol. | Cat. Pol. (wt %) | Binder 1 (wt %) | Binder 2 (wt %) | XL (wt %) |
|---|---|---|---|---|---|
| 30 | P4 | 3 | 2.4 | 0 | 0.6 |
| 31 | P4 | 3 | 2.4 | 0 | 0.6 + 0.8 |
| 32 | P4 | 3 | 0 | 3 | 0.8 |
| 33 | P4 | 4 | 1.6 | 0 | 0.4 |
| 34 | P4 | 4 | 1.6 | 0 | 0.4 + 0.8 |
| 35 | P4 | 4 | 0 | 2 | 0.8 |
| 36 | P5 | 3 | 2.4 | 0 | 0.6 |
| 37 | P5 | 3 | 2.4 | 0 | 0.6 + 0.8 |
| 38 | P5 | 3 | 0 | 3 | 0.8 |
| 39 | P5 | 4 | 1.6 | 0 | 0.4 |
| 40 | P5 | 4 | 1.6 | 0 | 0.4 + 0.8 |
| 41 | P5 | 4 | 0 | 2 | 0.8 |
| C12 | P4 | 3 | 0 | 3 | 0 |
| C13 | P4 | 4 | 0 | 2 | 0 |
| C14 | P5 | 3 | 0 | 3 | 0 |
| C15 | P5 | 4 | 0 | 2 | 0 |

TABLE 9

| Ex. | Cat. Pol. | Cat. Pol. (wt %) | Binder 1 (wt %) | Binder 2 (wt %) | XL (wt %) | SR (ohm/sq) | CD (sec) | Resin Adh. |
|---|---|---|---|---|---|---|---|---|
| 30 | P4 | 49 | 39 | 0 | 10 | $2.8 \times 10^9$ | 1.60 | 5 |
| 31 | P4 | 43 | 35 | 0 | 20 | $4.5 \times 10^9$ | 0.03 | 4-5 |
| 32 | P4 | 43 | 0 | 43 | 12 | $9.2 \times 10^8$ | 0.04 | 4-5 |
| 33 | P4 | 65 | 26 | 0 | 7 | $9.3 \times 10^8$ | 0.19 | 2-3 |
| 34 | P4 | 58 | 23 | 0 | 17 | $6.7 \times 10^8$ | 0.03 | 4-5 |
| 35 | P4 | 58 | 0 | 29 | 12 | $1.0 \times 10^9$ | 0.35 | 5 |
| 36 | P5 | 49 | 39 | 0 | 10 | $2.3 \times 10^9$ | 1.22 | 4-5 |
| 37 | P5 | 43 | 35 | 0 | 20 | $7.1 \times 10^9$ | 0.05 | 0-2 |
| 38 | P5 | 43 | 0 | 43 | 12 | $8.3 \times 10^8$ | 0.05 | 5 |
| 39 | P5 | 65 | 26 | 0 | 7 | $5.6 \times 10^8$ | 6.03 | 5 |
| 40 | P5 | 58 | 23 | 0 | 17 | $2.5 \times 10^9$ | 0.86 | 0 |
| 41 | P5 | 58 | 0 | 29 | 12 | $1.1 \times 10^9$ | 0.76 | 5 |
| C12 | P4 | 49 | 0 | 49 | 0 | $8.2 \times 10^8$ | 11.69 | 5 |
| C13 | P4 | 65 | 0 | 33 | 0 | $4.5 \times 10^8$ | 0.24 | 5 |
| C14 | P5 | 49 | 0 | 49 | 0 | $5.3 \times 10^8$ | NM[1] | 0* |
| C15 | P5 | 65 | 0 | 33 | 0 | $2.8 \times 10^8$ | NM | 0* |

[1] not measured

Examples 42-66 and Comparative Examples 16-32 (C16-C32)

Cationic polymers were used to prepare aqueous coating formulations containing 5.0 wt % cationic polymer, 5.0 wt % RHOPLEX 3208 solids, 2.5 wt % CYMEL 327, 0.1 wt % TOMADOL 25-9, and 0.03 wt % CYCAT 4045 solids. Formulations for Examples 42-53, C16-C20, and C28 were coated and dried according to Coating Method A to give coatings containing 40 wt % cationic copolymer, 32 wt % acrylic binder, and 28 wt % crosslinking resin. Formulations for Examples 54-66, C21-C27, C29-C32 were coated and dried according to Coating Method B to give coatings containing 40 wt % cationic copolymer, 32 wt % acrylic binder, and 28 wt % crosslinking resin. After haze and surface resistivity were measured, the samples were overcoated with the radiation-curable composition which was then cured using the above procedure except using a microstructured tool prepared as described in U.S. Pat. No. 5,771,328. Charge decay and resin adhesion were measured; results are shown in Table 10.

TABLE 10

| Ex. | Cat. Pol. | AET MAC (wt %) | Hyd. Mon. (wt %) | NVP (wt %) | AET MAC + NVP (wt %) | HEMA (wt %) | Haze (%) | SR (ohm/sq) | CD (sec) | Resin Adh. |
|---|---|---|---|---|---|---|---|---|---|---|
| 42 | P15 | 20 | 20 | 40 | 60 | 20 | 1.8 | $1.9 \times 10^{13}$ | 8.64 | 5 |
| 43 | P17 | 20 | 27.5 | 47.5 | 67.5 | 5 | 1.7 | $2.3 \times 10^{13}$ | 5.82 | 5 |
| 44 | P24 | 20 | 40 | 20 | 40 | 20 | 1.6 | $1.1 \times 10^{13}$ | 12.58 | 1 |
| 45 | P23 | 34.2 | 14.2 | 43.2 | 77.4 | 8.4 | 5.8 | $9.5 \times 10^{10}$ | 0.06 | 5 |
| 46 | P16 | 37.5 | 40 | 17.5 | 55 | 5 | 1.7 | $1.8 \times 10^{12}$ | 0.04 | 5 |
| 47 | P25 | 40 | 20 | 20 | 60 | 20 | 3.5 | $1.0 \times 10^{11}$ | 0.11 | 5 |
| 48 | P29 | 40 | 25 | 30 | 70 | 5 | 3.4 | $2.1 \times 10^{10}$ | 0.01 | 5 |
| 49 | P30 | 40 | 25 | 30 | 70 | 5 | 4.0 | $2.1 \times 10^{10}$ | 0.01 | 5 |
| 50 | P31 | 40 | 25 | 30 | 70 | 5 | 5.3 | $3.9 \times 10^{10}$ | 0.02 | 5 |
| 51 | P32 | 40 | 25 | 30 | 70 | 5 | 2.6 | $1.3 \times 10^{10}$ | 0.03 | 5 |
| 52 | P33 | 40 | 25 | 30 | 70 | 5 | 1.8 | $8.1 \times 10^{10}$ | 0.08 | 4 |
| 53 | P34 | 40 | 25 | 30 | 70 | 5[1] | 2.6 | $2.3 \times 10^{10}$ | 0.02 | 5 |
| 54 | P3 | 40 | 25 | 30 | 70 | 5 | 5.1 | NM[2] | 0.10 WNC[3,4] | 3.7 |
| 55 | P40 | 40 | 32.5 | 22.5 | 62.5 | 5 | 0.9 | NM | 0.11 >30[4] | 5 |
| 56 | P35 | 40 | 40 | 15 | 55 | 5 | 0.7 | NM | 0.04 WNC[4] | 3 |
| 57 | P45 | 40 | 40 | 15 | 55 | 5 | 0.5 | NM | 0.13 WNC[4] | 4 |
| 58 | P48 | 40 | 40 | 15 | 55 | 5 | 2.4 | NM | 0.21 WNC[4] | 3 |
| 59 | P59 | 40 | 40 | 15 | 55 | 5 | 1.0 | NM | 1.64 30[4] | 5 |
| 60 | P54 | 40 | 32.5 | 22.5 | 62.5 | 5 | 10.2 | NM | 0.74 WNC[4] | 5 |
| 61 | P50 | 40 | 25 | 30 | 70 | 5 | 9.9 | NM | 0.05 8.95[4] | 4 |
| 62 | P43 | 47.5 | 40 | 7.5 | 55 | 5 | 0.4 | NM | 0.02 2.44[4] | 3 |
| 63 | P57 | 47.5 | 40 | 7.5 | 55 | 5 | 4.5 | NM | 0.07 13.8[4] | 5 |

TABLE 10-continued

| Ex. | Cat. Pol. | AET MAC (wt %) | Hyd. Mon. (wt %) | NVP (wt %) | AET MAC + NVP (wt %) | HEMA (wt %) | Haze (%) | SR (ohm/sq) | CD (sec) | Resin Adh. |
|---|---|---|---|---|---|---|---|---|---|---|
| 64 | P20 | 20 | 40 | 35 | 55 | 5 | 1.5 | $1.2 \times 10^{13}$ | WNC | 5 |
| 65 | P44 | 53.3 | 28.3 | 13.3 | 66.6 | 5 | 1.0 | NM | 0.01 0.49[4] | 4 |
| 66 | P47 | 53.3 | 28.3 | 13.3 | 66.6 | 5 | 1.3 | NM | 0.02 0.87[4] | 4 |
| C16 | P22 | 20 | 0 | 60 | 80 | 20 | 17.5 | $1.5 \times 10^{12}$ | 0.96 | 4.5 |
| C17 | P27 | 20 | 15 | 60 | 80 | 5 | 24 | $1.4 \times 10^{12}$ | 3.42 | 5 |
| C18 | P28 | 35 | 0 | 60 | 95 | 5 | 48 | $3.5 \times 10^{12}$ | WNC | 5 |
| C19 | P26 | 40 | 0 | 40 | 80 | 20 | 77 | $1.9 \times 10^{11}$ | 0.11 | 4 |
| C20 | P37 | 45 | 20 | 30 | 75 | 5 | 21.2 | NM | 0.04 7.86[4] | 4 |
| C21 | P51 | 45 | 20 | 30 | 75 | 5 | 34.5 | NM | 0.02 1.26[4] | 4 |
| C22 | P46 | 70 | 20 | 5 | 75 | 5 | 18.4 | NM | 0.01 0.05[4] | 4 |
| C23 | P58 | 53.3 | 28.3 | 13.3 | 66.6 | 5 | 31.4 | NM | 0.02 0.58[4] | 4 |
| C24 | P61 | 53.3 | 28.3 | 13.3 | 66.6 | 5 | 26.8 | NM | 0.01 0.39[4] | 3 |
| C25 | P41 | 57.5 | 20 | 17.5 | 75 | 5 | 24.5 | NM | 0.01 0.28[4] | 2 |
| C26 | P55 | 57.5 | 20 | 17.5 | 75 | 5 | 71.8 | NM | 0.01 0.13[4] | 2 |
| C27 | P13 | 60 | 0 | 20 | 80 | 20 | 79 | $6.0 \times 10^{13}$ | 0.02 | 3 |
| C28 | P14 | 60 | 0 | 35 | 95 | 5 | 83 | $2.6 \times 10^{13}$ | 0.01 | 5 |
| C29 | P18 | 60 | 17.5 | 17.5 | 77.5 | 5 | 46 | $9.1 \times 10^{9}$ | 0.03 | 5 |
| C30 | P36 | 70 | 20 | 5 | 75 | 5 | 24.1 | NM | 0.01 | 3 |
| C31 | P49 | 70 | 20 | 5 | 75 | 5 | 63.2 | NM | 0.01 0.06[4] | 3 |
| C32 | P60 | 70 | 20 | 5 | 75 | 5 | 58.5 | NM | 0.01 0.06[4] | 1 |

[1] HEA instead of HEMA
[2] not measured
[3] would not charge
[4] measured at 20% RH Examples 67-72

Cationic polymers were used to prepare aqueous coating formulations containing 5.0 wt % cationic polymer, 5.0 wt % RHOPLEX 3208 solids, 2.5 wt % CYMEL 327, 0.1 wt % TOMADOL 25-9, and 0.03 wt % CYCAT 4045 solids. Formulations were coated and dried according to Coating Method C to give coatings containing 40 wt % cationic copolymer, 32 wt % acrylic binder, and 28 wt % crosslinking resin. After haze was measured, the samples were overcoated with a radiation-curable composition which was the same as the one described above, except that it contained 1.0 wt % DAROCUR 1173 and 0.5 wt % TPO. The radiation-curable composition was then cured using the above procedure except using a microstructured tool prepared as described in U.S. Pat. No. 5,771,328. Charge decay and resin adhesion were measured; results are shown in Table 11.

TABLE 11

| Ex. | Cat. Poly. | Haze (%) | CD (sec) | Resin Adhesion |
|---|---|---|---|---|
| 67 | P1 | 0.9 | 0.59 | 5 |
| 68 | P2 | 0.8 | 0.2 | 5 |
| 69 | P3 | 2.3 | 0.21 | 5 |
| 70 | P12 | 2.3 | 0.01 | 5 |
| 71 | P62 | 1.3 | 0.02 | 5 |
| 72 | P63 | 1.2 | 3.28 | 5 |

Comparative Examples 33-38 (C33-C38)

The following lithium compounds were evaluated:
Li1=lithium bis(trifluoromethanesulfonyl)imide
Li2=lithium poly(styrenesulfonate)
Li3=lithium p-toluenesulfonate
Li4=lithium methanesulfonate
Li5=N,N-bis(2-hydroxyethyl)-N-(3'-dodecyloxy-2'-hydroxypropyl)methyl ammonium methosulfate (CYASTAT 609)

The lithium compounds and Binder 1 were used to prepare the aqueous coating formulations shown in Table 12. Formulations were coated on unprimed 5 mil PET film using a #6 wire-wound rod. The coated films were then dried in a forced-air oven for 3 min. at either 100° C. or 150° C. Surface resistivity was measured on the resulting coatings, and results are shown in Table 12. After surface resistivity was measured, C33 was overcoated with the radiation-curable composition which was then cured. Resin adhesion was determined.

TABLE 12

| Ex. | Salt | Salt (wt %) | Binder 1 (wt %) | SR (ohm/sq) | Resin Adhesion |
|---|---|---|---|---|---|
| C33 | Li1 | 0.8 | 4[1] | $>10^{12}$ | NM[2] |
| C34 | Li2 | 0.8 | 4[1] | $>10^{12}$ | NM |
| C35 | Li3 | 0.8 | 4[1] | $>10^{12}$ | NM |
| C36 | Li4 | 0.6 | 4[1] | $>10^{12}$ | NM |

TABLE 12-continued

| Ex. | Salt | Salt (wt %) | Binder 1 (wt %) | SR (ohm/sq) | Resin Adhesion |
|---|---|---|---|---|---|
| C37 | Li5 | 0.24 | 6³ | >10¹² | 0* |
| C38 | Li5 | 0.96 | 6³ | >10¹² | NM |

[1] also contained 0.1 wt % TERGITOL TMN6; dried at 100° C.
[2] not measured
[3] also contained 0.1 wt % TOMADOL T25-9 and 0.06 wt % CYCAT 4040; dried at 150° C.

Examples 73 and 74 and Comparative Example 39 (C39)

Coating formulations containing 4 wt % cationic polymer in deionized water were coated on unprimed 5 mil PET film using a #3 wire-wound rod. The coated films were then dried in a forced-air oven at 100° C. for 3 min. Surface resistivity was measured on the resulting coatings; results are shown in Table 13.

TABLE 13

| Ex. | Cationic Polymer | SR (ohm/sq) |
|---|---|---|
| 73 | P64 | $1.1 \times 10^{10}$ |
| 74 | P65 | $3.0 \times 10^{12}$ |
| C39 | P66 | $7.2 \times 10^{13}$ |

What is claimed is:

1. An article comprising:
A) a substrate; and
B) an antistatic layer disposed on the substrate, the antistatic layer comprising:
   a) a cationic copolymer consisting essentially of:
      i) from about 20 to less than 70 wt % of a cationic monomer having the formula:

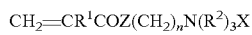
      $CH_2=CR^1COZ(CH_2)_nN(R^2)_3X$ wherein
      Z is O, S, or NH;
      $R^1$ is H or $CH_3$;
      $R^2$ independently comprises an alkyl group having from 1 to 4 carbon atoms;
      X is an anion selected from the group consisting of halogen, nitrate, alkylsulfate, alkanesulfonate, and haloalkanesulfonate; and
      n=2 to 6; and
   ii) from about 10 to about 75 wt % of a hydrophobic monomer comprising an aliphatic alkyl (meth)acrylate monomer having a hydrocarbon group of from 1 to 12 carbon atoms; and
   iii) from about 2 to about 25 wt % of a crosslinkable monomer having the formula:

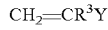
      $CH_2=CR^3Y$ wherein
      $R^3$ is H or $CH_3$; and
      Y is selected from the group consisting of $CO_2M$, L-$CO_2M$, L-OH, and $CONH_2$, wherein M is H or a counterion, and L is a divalent linking group comprising alkylene, arylene, heteroalkylene, ether, carbonyl, ester, amido, or sulfonamido functionality, or a combination thereof;
b) a non-cationic (meth)acrylic polymer which comprises no monomer with —OH or —$CO_2H$ functional groups; and
c) a crosslinking agent selected from the group consisting of melamine-formaldehyde, urea-formaldehyde, glycoluril-formaldehyde, aziridine, carbodiimide, isocyanate, and epoxy crosslinkers.

2. The article of claim 1,
the cationic monomer comprising an alkyl salt of dimethylaminoethyl acrylate;
the hydrophobic monomer comprising ethyl (meth)acrylate, methyl (meth)acrylate, butyl (meth)acrylate, iso-octyl (meth)acrylate, iso-bornyl (meth)acrylate, or a combination thereof; and
the crosslinkable monomer comprising hydroxyethyl (meth)acrylate.

3. The article of claim 1, the non-cationic (meth)acrylic polymer comprising an alkyl (meth)acrylate copolymer or an acrylic core/shell copolymer.

4. The article of claim 1, the antistatic layer comprising:
from about 25 to about 70 wt. % of the cationic copolymer;
from about 10 to about 50 wt. % of the non-cationic (meth) acrylic polymer; and
from about 5 to about 35 wt. % of the crosslinking agent.

5. The article of claim 1, the antistatic layer having a thickness of from about 50 to about 400 nm.

6. The optical article of claim 1, having a charge decay time of less than about 10 sec at 40% relative humidity.

7. The optical article of claim 1, having a charge decay time of less than about 10 sec at 20% relative humidity.

8. The optical article of claim 1, having a haze value of less than about 20%.

9. The article of claim 1, the substrate comprising polyethylene terephthalate, polyethylene naphthalate, cellulose triacetate, polypropylene, polyester, polycarbonate, polymethylmethacrylate, polyimide, polyamide, or a blend thereof.

10. The article of claim 1, the substrate comprising a reflective film, a polarizer film, a reflective polarizer film, a diffuse blend reflective polarizer film, a diffuser film, a brightness enhancing film, a turning film, a mirror film, or a combination thereof.

11. The article of claim 1, the substrate comprising a multilayer optical film having alternating layers of first and second optical layers, wherein the first and second optical layers have refractive indices along at least one axis that differ by at least 0.04.

12. The article of claim 1, further comprising a microstructured layer disposed on the antistatic layer, wherein the microstructured layer comprises a structured surface having a plurality of microstructures, and the structured surface comprises an outer surface of the article.

13. The article of claim 1, wherein the article is a reflective film, a polarizer film, a reflective polarizer film, a diffuse blend reflective polarizer film, a diffuser film, a brightness enhancing film, a turning film, a mirror film, or a combination thereof.

14. A display device comprising:
a display panel,
one or more light sources, and
the article of claim 1.

* * * * *